United States Patent Office 3,522,165
Patented July 28, 1970

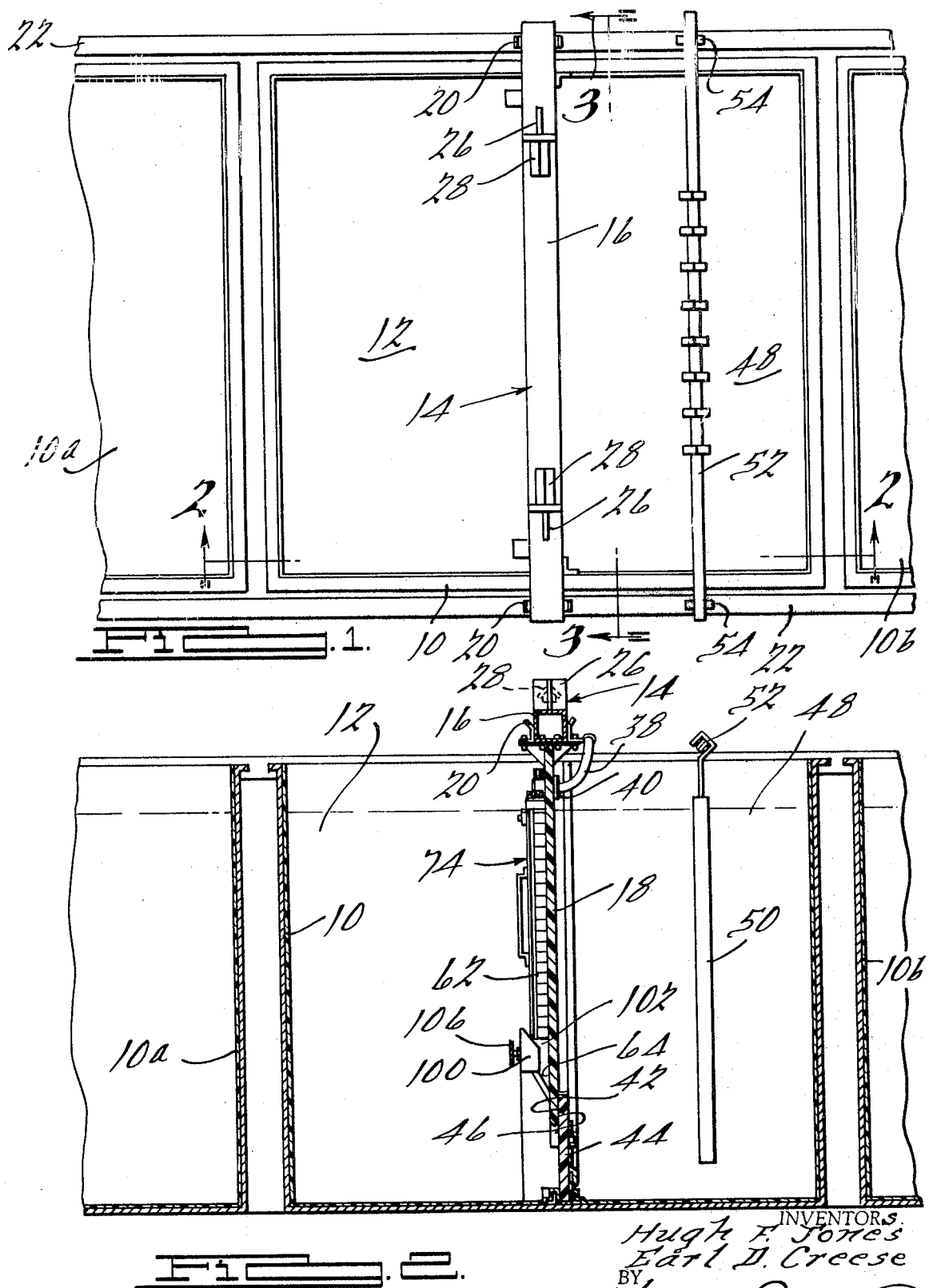

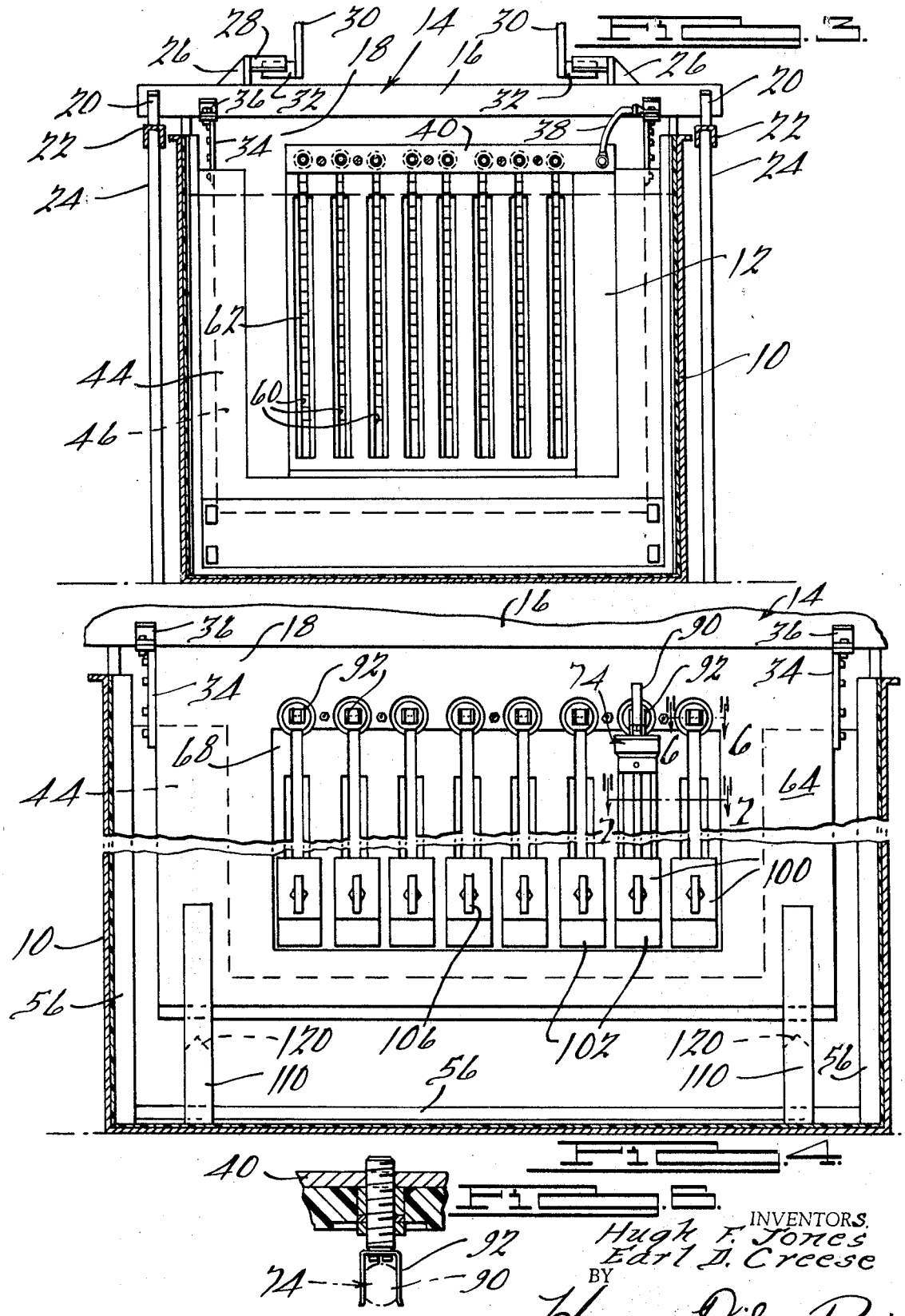

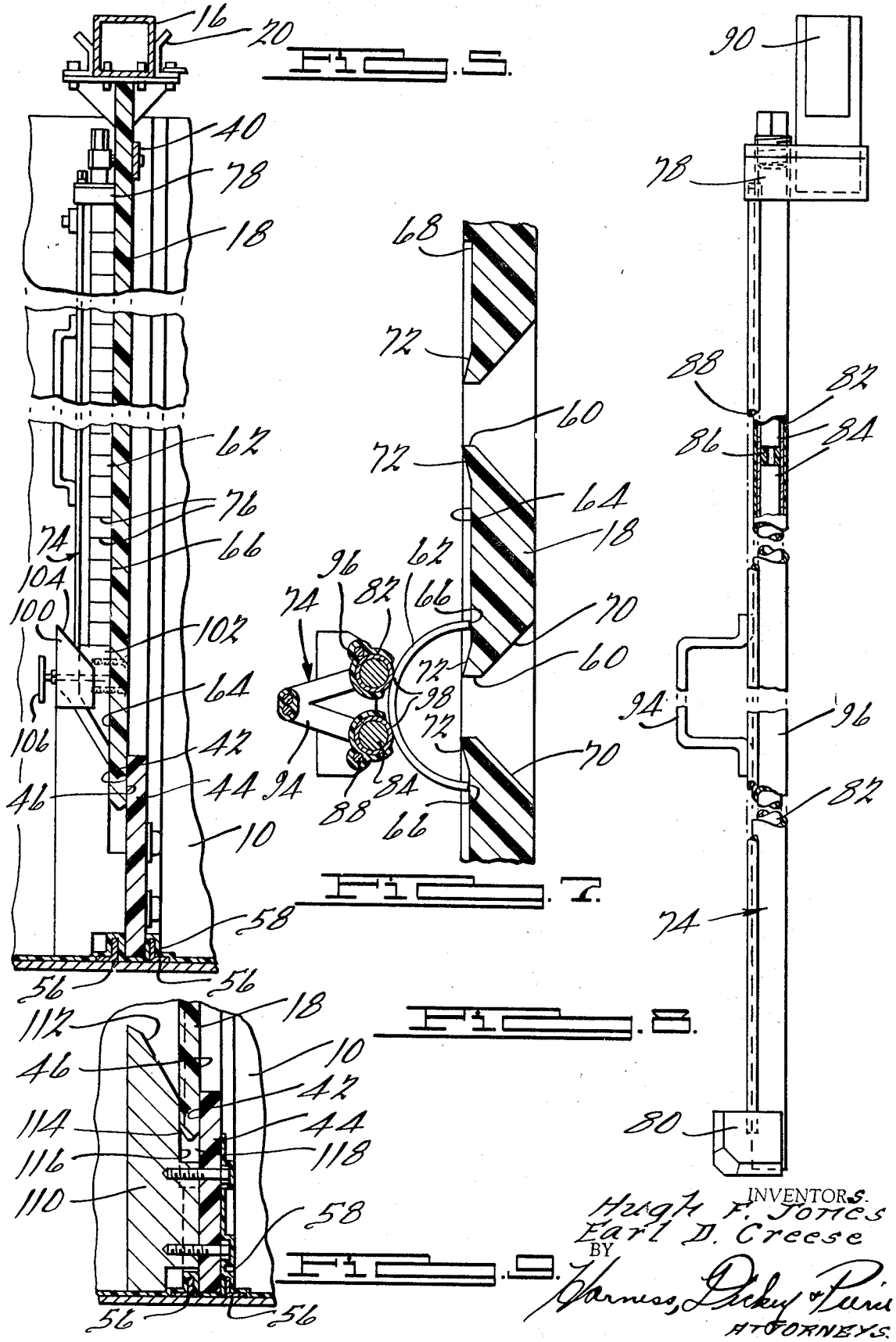

3,522,165
APPARATUS FOR PLATING ARTICLES
Hugh F. Jones, Detroit, and Earl D. Creese, St. Johns, Mich., assignors to Federal-Mogul Corporation, a corporation of Michigan
Filed Feb. 29, 1968, Ser. No. 709,314
Int. Cl. B65g 49/00
U.S. Cl. 204—198                    10 Claims

ABSTRACT OF THE DISCLOSURE

A method and an apparatus for applying a substantially uniform electroplating on the concave surfaces of arcuate workpieces by mounting the workpieces on a work rack comprising a panel provided with at least one elongated aperture therethrough, such that the concave surfaces are disposed in aligned communication with the aperture and in abutting relationship against one face side of the panel. The panel is adapted to be immersed in an electoplating solution contained in a treating receptacle in a manner such that the electroplating solution is divided into two compartments and wherein electric current potential is applied between the workpieces and an anode disposed on the other face side of the panel to effect a flow of current through the solution and the aperture between the anode and workpieces.

BACKGROUND OF THE INVENTION

The method and apparatus comprising the present invention is particularly applicable, but not necessarily limited to, the electroplating of precision shell-type half bearings which are of a semicylindrical cross section and which are conventionally employed for rotatably supporting journals such as crank shafts and connecting rods in internal combustion engines and the like. Bearings of this general type are conventionally of a composite construction comprising a high strength outer backing member, such as steel, for example, to the inner concave surface of which a lining of a bearing material is tenaciously bonded. The bearing lining may be applied such as by powder metallurgical techniques, casting, roll cladding, electrodeposition, or the like. The lining itself generally is composed of metals possessing good antifriction characteristics, such as copper and copper base alloys, aluminum and aluminum base alloys, and the like.

It is frequently desirable in the manufacture of such precision shell-type half bearings to apply an overplate of a suitable bearing metal on the accurately machined concave surface of the bearing lining in order to enhance the performance characteristics thereof. Such an overplate may comprise soft bearing metals, such as lead, tin, copper, indium and alloys thereof, for example, which are applied in a uniform layer generally ranging in thickness from several ten thousandths of an inch up to several thousandths of an inch. Uniformity in the thickness of the overplate is important to achieve a proper fit of the bearing with a journal to be rotatably supported thereby and it is also important that the back surfaces of the bearing be substantially devoid of any plating of the soft bearing material to assure an accurate supported fit of the bearing in the bearing cap and the avoidance of any subsequent loosening of the bearing as occasioned by the plastic flow of the soft overplate metal during operation.

Various techniques have heretofore been used or proposed for use for applying a uniform overplate to the concave surfaces of semicylindrical shell bearings while concurrently preventing any appreciable deposition of the overplate on the back surfaces thereof. So-called box-type plating racks of the type disclosed in U.S. Pat. No. 3,331,764 have been satisfactorily employed for this purpose but are susceptible to some processing disadvantages due to the difficulty in loading and unloading the bearings therefrom, as well as the susceptibility of such racks to cause excessive drag-out and drag-in of the treating solutions from one receptacle to the next receptacle. An alternative technique is described in U.S. Pat. No. 3,133,007, in which a slotted plating cell is stationarily disposed in a treating receptacle and stacked columns of bearings to be overplated are sequentially transferred to the cell, while supported on a suitable rack or holder, and are positioned with the concave surfaces thereof in aligned communication with the slot or elongated aperture provided in one wall of the cell. While the apparatus as described in the aforementioned patent overcomes some of the problems of conventional box-type plating racks, some difficulty has been encountered in achieving appropriate alignment of the bearings with the slot formed in the cell, which results in a nonuniformity of the electroplating deposited on the concave surfaces of the workpieces. Cell plating systems of the foregoing type are further characterized by their less than optimum flexibility and versatility for processing bearings of different sizes.

In addition to the two techniques as described in U.S. Pats. Nos. 3,331,764 and 3,133,007, both of which are assigned to the same assignee as the present invention, still other methods have been proposed including the mounting of the bearings on a suitable work rack and physically masking or shielding the rear surfaces of the bearing to prevent any electrodeposition thereon. The foregoing and other techniques heretofore used have been found extremely time-consuming, tedious and inefficient in the manufacture of precision-type shell bearings.

The foregoing disadvantages are overcome in accordance with the method and apparatus comprising the present invention, whereby a transportable work rack is provided, including a panel formed with an elongated aperture or slot therethrough and on one side of which a stacked column of bearings are adapted to be removably mounted so as to be disposed in aligned communication with the aperture. The open construction of the work rack substantially eliminates any undesirable solution drag-out and drag-in during the course of the transfer of the rack and the workpieces thereon through the several treating stations. In addition, the open construction of the panel enables an operator to effect a simple, quick and accurate loading of the workpieces thereon, assuring accurate aligned communication with the aperture, substantially enhancing the efficiency and ease of handling of the bearings to be plated. In addition, the panel of the work rack can be provided with a plurality of elongated apertures or slots disposed in spaced-apart relationship, providing for a workpiece capacity substantially in excess of that heretofore attainable which still further provides for improved efficiency and ease in the manufacture of shell-type precision bearings.

SUMMARY OF THE INVENTION

The foregoing and other advantages and benefits of the present invention are achieved by a process and an apparatus for electroplating the concave surfaces of arcuate workpieces which includes a treating receptacle or tank which is adapted to be at least partially filled with an electroplating solution. A work rack is provided which includes a panel formed with one or more elongated apertures therethrough, on which mounting means are provided for removably mounting a workpiece or a plurality of workpieces in side-edge to side-edge stacked relationship and in aligned communication with the aperture such that the end edges thereof are disposed in abutting relationship against one face side of the panel. Receiving means are provided in the receptacle for removably receiving and engaging the panel when immersed in the receptacle such that the electroplating solution is divided into two noncommunicating compartments, including an anode compartment on the other face side of the panel, in which one or a plurality of anodes are adapted to be immersed. Suitable means are provided for electrifying the workpieces on the panel to effect a flow of current between the workpieces and the anode through the solution and the elongated aperture in the panel to provide a substantially uniform electric deposition of a soft bearing metal thereon.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a plan view of a treating receptacle and a work rack constructed in accordance with the preferred embodiments of the present invention;

FIG. 2 is a vertical longitudinal sectional view of the treating receptacle and work rack shown in FIG. 1, and taken substantially along the line 2—2 thereof;

FIG. 3 is a transverse vertical sectional view of the treating receptacle shown in FIG. 1, and taken substantially along the line 3—3 thereof;

FIG. 4 is a fragmentary magnified transverse vertical sectional view of the opposite side of the work rack panel illustrating a workpiece holder installed on one face side thereof;

FIG. 5 is a fragmentary magnified vertical sectional view of the side edge of the work rack panel shown in FIG. 4;

FIG. 6 is a fragmentary horizontal sectional view of a retainer device for removably securing a holder on one face side of the panel as shown in FIG. 4, and taken substantially along the line 6—6 thereof;

FIG. 7 is a transverse horizontal sectional view taken through the panel and workpiece holder as shown in FIG. 4 and taken substantially along the line 7—7 thereof;

FIG. 8 is a fragmentary magnified side elevational view, partly in section, of the holder for removably mounting the workpieces on the panel; and FIG. 9 is a fragmentary enlarged side elevational view, partly in section, illustrating the supporting member in the treating receptacle for receiving and supporting the panel.

DESCRIPTION OF THE PREFERRED EMBODIMENTS

Referring now in detail to the drawings, and as may be best seen in FIGS. 1–3, the apparatus for plating the concave surfaces of workpieces is illustrated, which is constructed in accordance with a preferred embodiment of the present invention. In the arrangement illustrated, an electroplating cell or receptacle 10 is provided, which is adapted to be at least partially filled with a suitable electroplating solution 12, into which the workpieces are immersed. The electroplating cell is conventionally disposed in an aligned series of tanks or receptacles, through which a work rack 14, comprising a transversely extending work bar 16 and a supporting panel 18, is sequentially conveyed, whereby the workpieces thereon are subjected to a pretreatment cycle usually including a cleaning tank, a pickling tank and a single or multiple water rinse, whereafter the rack is transferred to the cell plating receptacle, at which the desired metal overplate of a preselected thickness is applied on the concave surfaces. Since the cell plating operation for applying the overplate is usually of a time duration substantially greater than the pretreatment and after treatment operations, a series of plating cells, such as the cells 10a and 10b, as shown in FIGS. 1 and 2, are provided, to which individual work racks are transferred and are allowed to remain for the prescribed treating duration. At the completion of the cell plating opertaion, the work racks and the workpieces thereon are sequentially transferred through a suitable after-treatment phase, such as a cold and/or warm water rinse station, and a final drying operation.

The work rack 14 serves to appropriately support the workpieces thereon during their conveyance through the pretreatment and after-treatment processing steps, minimizing solution drag-out and drag-in between successive treating receptacles and further serves a specific function in combination with the construction of the cell plating receptacle 10 to provide for a substantially uniform overplate on the concave surface of the workpiece, while minimizing any electrodeposition of metal on the back surfaces thereof.

As shown in FIGS. 1–3, the work bar 16 extends transversely above the receptacle 10 and is adapted to be suitably supported at each end portion thereof in suitable U-shaped saddles 20, which may be mounted on a beam 22 supported by columns 24 extending along the sides of the aligned series of treating receptacles. The work bar 16 preferably is composed of an electrically conductive material, such as copper or a copper-base alloy, and one of the saddles 20, which is also of a conductive metal, may suitably be electrified during the cell plating operation for the purpose of effecting an electrification of the workpieces in a manner subsequently to be described.

In the exemplary embodiment illustrated in FIGS. 1–3, a pair of transversely spaced brackets 26 are affixed to the upper surface of the work bar 16, to which an inwardly extending lift member 28 of an inverted V-shaped configuration is rigidly secured. A transfer of the work rack, including the work bar and panel 18 affixed thereto, can conveniently be achieved manually, and preferably by a mechanized hoist or conveyor system of the various types known in the art, including a pair of lift arms 30, as best seen in FIG. 3, having engaging or lift members 32 projecting laterally thereof, which are adapted to underlie and engage the lift member 28 on the work bar, effecting thereby a lifting of the work bar and panel to and from a lowered position, as shown in solid lines in FIG. 2, to a raised position in which the lower portion of the panel is disposed in clearance relationship above the partitions separating adjoining treating receptacles.

The panel 18, as shown in FIGS. 1–5, is of a substantially planar rectangular configuration and, preferably, is composed of a nonconductive material which is resistant to the various alkaline and acidic treating solutions in which it is immersed. Alternatively, the panel may comprise a metal plate having a suitable electrically nonconductive protective coating thereover for protecting the underlying panel from attack from the several treating solutions. In the exemplary embodiment illustrated, the panel is formed of a synthetic resinous material, such as, for example an acrylonitrile-butadiene-syrene resinous material, which provides satisfactory performance. The panel 18 is secured along its upper portion to the work bar by means of side brackets 34, which are secured such as by means of screws along the upper side edges of the panel and in turn are bolted to angle brackets 36, affixed to the side surfaces of the work bar. At least one of the angle brackets 36 is preferably of a suitable electrically conductive metal for transferring the current from the work bar to a cable 38, as shown in FIGS. 2 and 3, which in turn is connected to a bus bar 40 extending horizontally across the upper portion of the panel.

The panel 18, when the work rack 14 is disposed in the lower position at the cell plating receptacle 10, is positioned with the side portions and lower portion thereof disposed in overlying abutting contact against a rear face 42 of a generally U-shaped partition 44 stationarly mounted within the treating receptacle. The upstanding or upright leg portions of the U-shaped partition 44 extend upwardly to a height above the level of the electroplating solution contained in the receptacle such that in combination with the panel and the workpieces mounted thereon, the electroplating solution is divided into two separate bodies or compartments disposed in substantially liquid-tight sealed relationship from each other. While some liquid circulation may occur between the mating rear face 42 of the partition and the mating face side 46 of the panel 18, the restriction provided is sufficient to minimize any appreciable flow of current through the electroplating solution from an anodic compartment indicated at 48 to the rear surfaces of the workpieces mounted on the panel. As shown in FIGS. 1 and 2, a plurality of anodes 50 are adapted to be suspended from an anode bar 52 extending transversely of the treating receptacle and with the end portions thereof supported in suitable electrically conductive saddles 54 mounted adjacent to the upper edge of the receptacle which are connected to a suitable current supply in a manner well known in the art.

The U-shaped partition 44 similarly is composed of a material which is resistant to attack by the electroplating solution contained in the receptacle and may also comprise, for example, an ABS resin material of which the panel 18 is composed. The partition 44 is maintained in appropriate upright transverse relationship within the receptacle by means of a channel formed by an angle iron members 56 affixed to the side walls and base of the receptacle and between which the side edges and lower edge of the partition are slidably received and secured thereto. The angle iron members 56, as shown in FIG. 9, are preferably provided with a suitable lining, such as a plastisol lining 58, for example, for protecting the members from corrosive attack by the silution. Similarly, the inner surfaces of the receptacle may also be provided with a protective nonconductive corrosion resistant lining. The opening provided in the center portion of the U-shaped partition 44 is of a size sufficient to expose a series of vertically extending elongated apertures or slots 60 formed through the panel 18 and against the rearward surface of which a stacked column of workpieces 62 are disposed in aligned communication therewith.

As best seen in FIGS. 4–7, one face side 64 of the panel 18, against which the end edges 66 of the workpieces are disposed in abutting contact, is recessed, as indicated at 68 in FIGS. 4 and 7, to assure an accurate planar surface and to further provide for a lipped slot construction having a configuration as illustrated in FIG. 7. The slot configuration as exemplified in the drawings constitutes a preferred configuration and is in accordance with that disclosed in U.S. Pat. No. 3,331,764, to which reference is made for further details. The slot 60, as best seen in FIG. 7 and as described in the aforementioned United States patent, is provided with an outwardly tapered throat 70 extending for the entire length thereof and is further formed with an angularly extending lip 72 projecting rearwardly of the recessed surface 68 and beyond the plane passing through the end edges 66 of the concave workpieces. Conventionally, the width of the slot is controlled within a range corresponding to about 20% to about 42% of the diameter of the semicylindrical workpieces being plated and the angular lip or projection is controlled within an angularity of from about 7° to about 15° relative to the plane of the recessed surface 68. The width of each of the angular lips 72 generally ranges between about 12% to bout 40% of the diameter of the configuration of the concave surface being plated. A control of the configuration of the slot within the aforementioned ranges has been found to provide for a substantial improvement in the uniformity of the thickness of the overplate applied to the concave surface. It will be appreciated, however, that other slot configurations can also be satisfactorily employed in the practice of the present invention achieving the same benefits in the ease and efficiency of handling a plurality of concave workpieces.

The stacked column of workpieces 62 can be mounted directly against the recessed surface 68 of the panel by suitable clamping means thereon, or preferably, by means of a holder 74 as illustrated in FIGS. 4 through 8, which is loaded while dismounted from the panel and thereafter is readily mountable thereon in a manner subsequently to be described. The removable mounting of the concave workpieces 62 is done in a manner such that the adjacent side edges 76 thereof, as shown in FIG. 5, are disposed in aligned stacked relationship with the adjacent ones of the workpieces and with the end edges 66 thereof in abutting contact against the recessed surface 68 of the panel. The longitudinal axis of curvature of the workpieces is disposed in substantial longitudinal alignment with the axis of the slot 60 and the side edges 76 of the uppermost workpiece is adapted to be positioned against end member 78 of the holder 74, defining therebetween a concave cavity in communication with the slot and solution in the anodic compartment, while at the same time preventing any appreciable liquid circulation or current flow between the several engaging edges to the rearward surface of the workpieces. The holder 74 is adaptable for use with workpieces where at least the rearward surface thereof is composed of a magnetizable material such that the workpieces are magnetically retained on the holder prior to the mounting of the holder on the work rack.

In the holder construction as illustrated in FIGS. 7 and 8, a pair of spaced longitudinally extending tubes 82 which preferably are composed of a stainless steel are securely mounted to the upper end member 78 and a lower end member 80. Each tube is filled with a series of cylindrically-shaped magnets 84 positioned in repelling relationship with respect to adjacent ones of said magnets and separated by a suitable copper collar 86. A conductive rod 88, such as of copper, is soldered and extends along substantially the entire length of each tube 82 for enhancing the conduction of electricity therealong. The upper ends of the conducting rods 88 are connected in the end member 78 to a conductive shank 90, which is adapted to be disposed in electrical contact with a U-shaped spring clip 92 fastened to the upper edge of the panel and connected to the bus bar 40, as shown in FIGS. 4–6, when the holder is installed on the panel. As shown in FIG. 8, the holder is also preferably provided with a suitable handle 94 for facilitating manipulation thereof during the loading and unloading thereof, as well as installation and removal from the work rack.

The end members 78 and 80 of the holder are preferably composed of a suitable nonconductive resistant material, such as, for example, ABS, and the remaining surfaces of the tubes 82 and rods 88 are provided with a suitable nonconductive protective coating 96, such as a vinyl plastisol coating, over their exposed surfaces. The insulating protective coating 96 is cut away at 98, as shown in FIG. 7, to provide for contact between the back surface of a workpiece and the surface of the electrified tube 82.

The installation of the holder 74 incorporating a stacked column of the workpieces 62 thereon into appropriate position on the panel of the work rack is facilitated by means of a tapered guide block 100, as best seen in FIGS. 2, 4 and 5, which is mounted on a semicylindrical mounting block 102 secured to the lower portion of the face side 64 of the panel 18. The guide block 100 is provided with a tapered surface 104 for guiding the lower end member 80 of the holder into appropriate alignment with the slot in the panel and with the end edges of the workpieces in firm abutting engagement against the recessed surface of the panel. A T-handle adjusting screw 106 enables vertical adjustment of the guide block relative to the mounting block 102 to provide for optimum seating of the lowermost workpiece against the upper surface of the mounting block. The upper surface of the mounting block 102 is preferably provided with a dish-shaped configuration, which is disposed symmetrically relative to the longitudinal axis of the slot 60 for facilitating drainage of the solution during a withdrawal of the work rack from a treating receptacle, as well as assuring uniformity of the treatment of the concave surface. The upper end portion of the holder 74 is retained in appropriate aligned relationship relative to the slot and with the workpieces in bearing contact against the recessed surface by means of the clamping engagement by the U-shaped spring clip 92 along the side surfaces of the conductive shank 90.

It will be apparent from the foregoing description that a quick and simple unloading and loading of stacked columns of bearings on the work rack can be quickly and efficiently done with the assurance that the workpieces are in appropriate aligned communication relative to the slots in the panel. In the exemplary work rack illustrated, eight slots are provided, which are disposed in vertical spaced substantially parallel relationship and each of which is adapted to receive a stacked column of bearings, achieving a simultaneous electroplating or other chemical treatment of the concave surfaces thereof. It will be understood that the number of slots provided in the panel of the work rack and the relative length thereof can be varied consistent with such considerations as the size and depth of the treating receptacle and the production capacity required.

A work rack which has been fully loaded with arcuate workpieces to be plated is simply loaded from a raised position to a lowered position, as shown in FIG. 2, wherein the uppermost one of the workpieces is disposed below the level of the treating solution therein. The guidance of the panel into firm overlying contact against the rear face 42 of the U-shaped partition is achieved by one or a plurality of receiving members 110 securely fastened to the lower rear face of the partition, as best seen in FIG. 9. The receiving member 110, as shown, is provided with an angular cam surface 112 along the upper end thereof, which is adapted to coact with a chamfer or bevel 114 along the lower rearward edge of the panel during the descending movement of the work rack, effecting a biasing of the panel toward the partition. A vertical notch 116 is formed in the receiving member, which, in combination with the rear surface of the partition, defines an engaging slot 118 of a width to slidably receive the lower edge portion of the panel during the completion of its descending movement. The coaction of the engaging slot with the edge of the panel serves to maintain the panel itself in firm abutting contact against the rear face of the partition. Similarly, the upper portion of the panel is maintained in appropriate abutting contact with the partition by the U-shaped saddles 20, in which the end portions of the work bar 16 are slidably disposed. The receiving member 110 is preferably provided with a chamfered surface 120 at the base of the vertical notch 116, as shown in FIG. 4, to prevent the accumulation of foreign matter thereon. Conventionally, two receiving members are employed, which are located in transversely spaced relationship, as shown in FIG. 4, for engaging the panel adjacent to each side edge thereof.

It will be apparent from the foregoing description that a substantial simplification and ease in the processing and electroplating of the concave surfaces of arcuate workpieces is provided by the work rack and apparatus comprising the present invention. The open configuration of the work rack facilitates solution circulation and contact with the surfaces of the workpieces during the pretreatment, electroplating and after-treatment processing cycle, minimizing solution drag-out and drag-in, as well as assuring accurate alignment of the workpieces with the apertures or slots through the panel during the electroplating cycle and avoiding any significant deposition of metal on the rear surfaces thereof.

It will be appreciated in order to compensate for any small degree of ion migration passing between the contacting surfaces of the panel and partition, suitable robber bars can be suspended in the solution in a manner well known in the art on the workpiece side of the panel to effect a preferential deposition of metal thereon in lieu of the rear surfaces of the workpieces.

While it will be apparent that the invention disclosed herein is well calculated to fulfill the objects above stated, it will be appreciated that the invention is susceptible to modification, variation and change without departing from the proper scope or fair meaning of the subjoined claims.

What is claimed is:

1. In an apparatus for electroplating the concave surfaces of arcuate workpieces, the combination comprising a receptacle adapted to be at least partially filled with an electroplating solution, a work rack comprising a substantially planar panel formed with at least one elongated aperture therethrough, mounting means for removably mounting a workpiece with the concave surface thereof in aligned communication with said aperture and with the end edges thereof abutting one face side of said panel, receiving means for removably engaging and supporting said panel when immersed in said receptacle, and means for electrifying the workpiece on said panel for causing current to flow through said solution between an anodic compartment of said receptacle on the other face side of said panel through said aperture to said workpiece.

2. The apparatus as defined in claim 1, wherein said panel is provided with a plurality of elongated apertures therethrough disposed in spaced-apart relationship.

3. The apparatus as defined in claim 1, wherein said mounting means comprises a holder for removably mounting a column of workpieces in side-edge to side-edge stacked relationship, and engaging means on said one face side of said panel for removably securing said holder thereto wherein the workpieces are in aligned communication with said aperture.

4. The apparatus as defined in claim 1, wherein said receiving means in combination with said panel and said workpiece thereon divide the solution into said anodic compartment and a second compartment disposed in substantially liquid-sealed relationship from each other.

5. The apparatus as defined in claim 1, wherein said receiving means includes a partition secured within the interior of said receptacle and formed with an opening therethrough of a size sufficient to expose said aperture in said panel, and guide means for positioning and retaining said panel with said other face side in overlying contact against one face of said partition.

6. The apparatus as defined in claim 1, wherein said panel is supported in said receptacle in a substantially upright position and with the longitudinal axis of said aperture oriented in a substantially vertical direction.

7. The apparatus as defined in claim 1, wherein said aperture is formed with an outwardly tapered throat adjacent to said other face side and a lip adjacent to said one face side extending along the longitudinal side edges of said aperture and projecting outwardly beyond a plane passing through the end edges of the workpiece.

8. The apparatus as defined in claim 1, wherein said work rack further includes an electrically conductive work bar extending transversely of said receptacle to which said panel is secured, said bar adapted to be supported by a supporting member disposed adjacent to each side of said receptacle, and means for supplying an electrical current to at least one of said supporting members for transmission by said work bar to a workpiece on said panel.

9. The apparatus as defined in claim 3, wherein said holder is disposed in electrically conductive relationship with said workpieces and said holder is adapted to be connected to a source of electrical current.

10. The apparatus as defined in claim 5, wherein said guide means includes a cam surface for coacting with said panel in response to the descending movement thereof into said receptacle for biasing said panel toward and into overlying contact against said one face of said partition.

References Cited

UNITED STATES PATENTS

| | | | |
|---|---|---|---|
| 2,758,962 | 8/1956 | Luechauer | 204—23 X |
| 2,944,945 | 7/1960 | Allison | 204—268 X |
| 3,133,007 | 5/1964 | Creese et al. | 204—198 |
| 3,331,764 | 7/1967 | Beebe et al. | 204—297 |

PATRICK P. GARVIN, Primary Examiner

C. F. DEES, Assistant Examiner

U.S. Cl. X.R.

204—242, 267